United States Patent
Hashidzume et al.

(10) Patent No.: US 7,189,782 B2
(45) Date of Patent: Mar. 13, 2007

(54) THERMOPLASTIC FILM, THERMOPLASTIC RESIN COMPOSITION, AND PHYLLOSILICATE

(75) Inventors: Kiyonari Hashidzume, Soma (JP); Nobuaki Kido, Iwakuni (JP); Shunichi Matsumura, Iwakuni (JP)

(73) Assignee: Teijin Limited, Osaka (JP)

( * ) Notice: Subject to any disclaimer, the term of this patent is extended or adjusted under 35 U.S.C. 154(b) by 336 days.

(21) Appl. No.: 10/501,788

(22) PCT Filed: Sep. 10, 2003

(86) PCT No.: PCT/JP03/11584

§ 371 (c)(1), (2), (4) Date: Jul. 19, 2004

(87) PCT Pub. No.: WO2004/024820

PCT Pub. Date: Mar. 25, 2004

(65) Prior Publication Data

US 2005/0089698 A1    Apr. 28, 2005

(30) Foreign Application Priority Data

Sep. 11, 2002   (JP)   ............................. 2002-265179
Mar. 11, 2003   (JP)   ............................. 2003-064814

(51) Int. Cl.
C08K 9/04      (2006.01)
C08K 3/34      (2006.01)
C08K 3/10      (2006.01)
C08L 67/03     (2006.01)
C08L 69/00     (2006.01)

(52) U.S. Cl. ...................... 524/601; 524/445; 524/446; 524/447; 524/449; 524/451; 524/413; 524/611; 523/209; 523/216

(58) Field of Classification Search ................ 524/445, 524/446, 447, 449, 451, 413, 601, 611; 523/209, 523/216

See application file for complete search history.

(56) References Cited

U.S. PATENT DOCUMENTS

2004/0053061 A1*   3/2004   Yonezawa et al. .......... 428/458

FOREIGN PATENT DOCUMENTS

| JP | 8-337414 A    | 12/1996 |
| JP | 11-1605 A     | 1/1999  |
| JP | 11-71509 A    | 3/1999  |
| JP | 2000-7912 A   | 1/2000  |
| JP | 2000-336186 A | 12/2000 |
| JP | 2001-131400 A | 5/2001  |
| JP | 2002-105294 A | 4/2002  |
| JP | 2002-514265 A | 5/2002  |
| JP | 2002-370276 A | 12/2002 |
| WO | WO 00/60006 A1 | 10/2000 |

OTHER PUBLICATIONS

Yusuke Imai et al, High-Modulus Poly(ethylene terephthalate)/Expandable Flurine Mica Nanocomposites with a Novel Reactive Compatibilizer, 2002, Chem. Mater. 14, 477-479.*
Chyi-Ming Leu et al, Synthesis and Properties of Covalently Bonded Layered Silicates/Polyimide (BTDA-ODA) Nanocomposites, 2002, Chem Mater, 14, 3016-3021.*
Alexander B Morgan, et al, Characteization of the Dispersion of Clay in a Polyetherimide Nanocomposite, 2001, Macromolecules, 34, 2735-2738.*
Yusuke Imai, Satoshi Nishimura, Eiichi Abe, Hiroshi Tateyama Akimasa Abiko, Akira Yamaguchi, Tomohiro Aoyama, and Hiroaki Taguchi, High-Modulus Poly(ethylene terephthalate)/Expandable Fluorine Mica Nanocomposites with a Novel Reactive Compatibilizer, Chem. Mater. 2002, vol. 14, pp. 477-479.
Int'l Search Report, dated Oct. 14, 2003.

* cited by examiner

Primary Examiner—Margaret G. Moore
Assistant Examiner—Alicia M Toscano
(74) Attorney, Agent, or Firm—Sughrue Mion, PLLC

(57) ABSTRACT

There is provided a film comprising a layered silicate cation-exchanged with an organic cation and a polyester or polycarbonate. The organic cation is represented by the following formula (I):

$$(R)_n\text{-}L^+ \quad (I)$$

wherein R is a group represented by the following formula (I-1):

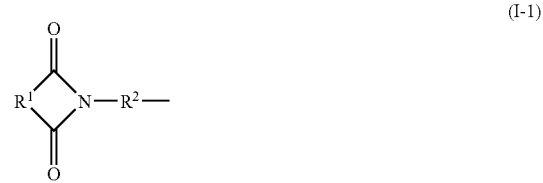

wherein $R^1$ is a divalent hydrocarbon group having 5 to 20 carbon atoms, and $R^2$ is a divalent hydrocarbon group having 1 to 20 carbon atoms, an alkyl group, an aryl group or an aralkyl group, $L^+$ is an ammonium ion, a phosphonium ion or a hetero aromatic ion, and n is an integer of 1 to 4, with the proviso that when $L^+$ is an ammonium ion or a phosphonium ion, n is 4 and four Rs may be the same or different. This film has the layered silicate highly dispersed therein and is excellent in various properties such as mechanical properties and dimensional stability.

17 Claims, 3 Drawing Sheets

THERMOPLASTIC FILM, THERMOPLASTIC RESIN COMPOSITION, AND PHYLLOSILICATE

TECHNICAL FIELD

The present invention relates to a film that comprises a thermoplastic resin composition which contains a layered silicate having an organic cation, the thermoplastic resin composition, and the layered silicate. More specifically, it relates to a film in which the layered silicate is highly dispersed and which has excellent properties including mechanical properties and dimensional stability, and a resin composition and a layered silicate which provide the film.

BACKGROUND ART

Thermoplastic resins including a polyester are used in a variety of applications due to their excellent properties, e.g., mechanical properties, moldability, heat resistance, weather resistance, light resistance and chemical resistance. For example, a polyester film is widely used in a variety of applications, e.g., for electric and electronic materials including a magnetic recording medium, an electronic mount board and a capacitor, for packing, for medical use, and for various industrial materials, due to excellent properties of the polyester, e.g., heat resistance, mechanical properties, electric properties, chemical resistance, optical properties and environmental resistance. However, along with technological improvements made in recent years, better properties have been increasingly demanded according to applications in which the polyester is used. For example, to use the polyester for electric and electronic materials including a magnetic recording medium and an electronic mount board, improvements in the mechanical properties including elastic modulus, dimensional stability, surface properties and other properties are desired.

Heretofore, as a measure to improve these properties, a film processing technique as typified by orientation by stretching has been employed to make full use of properties inherent in the polyester (refer to page 2 in JP-A 2002-370276(the term "JP-A" as used herein means an "unexamined published Japanese patent applications")).

However, with the conventional method, it is difficult to achieve properties better than those inherent in the polyester.

Meanwhile, recently, a so-called "nanocomposite" which is a composition prepared by dispersing a layered compound in a thermoplastic resin on a nano scale has been attracting attention. By forming the nanocomposite, properties improved over properties inherent in the resin have been attained with respect to various properties including high heat resistance, high elasticity, flame retardancy and a gas barrier property (refer to "World of the Nanocomposite", Sumi Nakajyo, Kogyo Chousakai, 2000).

As for nanocomposite films as well, a polyamide film (refer to page 2 in JP-A 2000-336186), a polyimide film (refer to page 2 in JP-A 2000-7912), a polycarbonate film (refer to page 2 in JP-A 2001-131400) and the like are known, and improvements in properties such as a gas barrier property are disclosed. However, in the case of the polyester film, few reports have been made because dispersion of a layered compound is very difficult. For example, a layer inorganic substance containing film using a silane clay complex as a layered compound and a polyester as a resin is disclosed (refer to page 2 in JP-A 11-71509).

However, the film has many unclear points since, for example, there are no descriptions about side reactions which are often seen at the time of formation of the nanocomposite (for example, in the case of the polyester, production of a dialkylene glycol chain (refer to page 14 in JP-A 2002-514265)). A polyester composition using a silane clay complex is described in Table 4 on page 59 of WO 00/60006. The polyester composition has significantly lower mechanical properties including flexural modulus than an ordinary polyester.

As described above, the polyester nanocomposite film is still in development, and progress in its development has been desired.

Meanwhile, as the layered compound used in the polymer nanocomposite, a layered compound cation-exchanged with an organic ammonium ion is generally used. However, the thermal stability of the layered compound is not so high, and the layered compound therefore cannot be used for a resin having a high molding temperature (refer to page 2 in JP-A 11-1605). As a measure to solve the problem, use of an onium ion having a high thermal decomposition temperature such as a phosphonium ion (refer to JP-A 11-1605) or a hetero aromatic ion (refer to page 2 in JP-A 8-337414) as a cation exchanger is known. Although these cation exchangers can solve the problem of thermal decomposition, organic groups contained in these cation exchangers are a general long-chain alkyl group or aromatic group, and compatibility with the resin is not considered. As a result, the compatibility of the layered compound with the resin is not so high. As examples with improved compatibility with the resin, an example using a polyalkoxylated ammonium ion as a cation exchanger for a layered compound (refer to page 2 in JP-A 2002-514265), an example using a layered compound cation-exchanged with a long-chain alkyl ammonium ion in combination with a polyimide having high compatibility with a polyester (refer to page 2 in JP-A 2002-105294, for example) and an example incorporating a unit which can be a part of the polymer into a cation exchanger (refer to Y. Imai et al., Chem. Mater., Vol. 14, pp. 477 to 479, 2002) are known.

However, in the case of JP-A 2002-514265, there is a problem with respect to heat resistances of a polyalkoxyl group and an ammonium ion. Further, in the case of JP-A 2002-105294, the polyimide must be used in a rather excessive amount for the layered compound, thereby causing a possibility that properties inherent in the matrix resin may be impaired. In addition, in the case of Chem. Mater., Vol. 14, pp. 477 to 479, 2002, there is formed a structure that the polymer appears to be crosslinked on the surface of a layered compound where the cation exchangers gather, thereby causing a possibility of deterioration in tenacity. Further, due to the characteristic of the reaction, a short-time process such as melt blending cannot be used, and the range of application of the production process is narrow. As described above, formation of a nanocomposite from a thermoplastic resin and development of improved properties by use of a layered compound still have many problems, and improvements thereof have been desired.

DISCLOSURE OF THE INVENTION

An object of the present invention is to provide a thermoplastic polyester film or thermoplastic aromatic polycarbonate film in which a cation-exchanged layered silicate is highly dispersed and which has excellent mechanical properties and dimensional stability.

Another object of the present invention is to provide a thermoplastic resin composition having a cation-exchanged layered silicate highly dispersed in a thermoplastic resin.

Still another object of the present invention is to provide a layered silicate which can be highly dispersed in a thermoplastic resin.

Other objects and advantages of the present invention will become apparent from the following description.

According to the present invention, firstly, the above objects and advantages of the present invention are achieved by a film which comprises a thermoplastic composition comprising:
(A) 100 parts by weight of at least one thermoplastic resin selected from the group consisting of a thermoplastic polyester and an aromatic polycarbonate, and
(B) 0.1 to 10 parts by weight, in terms of ash content, of layered silicate having, as at least a portion of cations, an organic cation represented by the following formula (I):

(R)$_n$-L$^+$    (I)

wherein R is a group represented by the following formula (I-1):

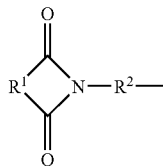

(I-1)

wherein R$^1$ is a divalent hydrocarbon group having 5 to 20 carbon atoms, and R$^2$ is a divalent hydrocarbon group having 1 to 20 carbon atoms,
an alkyl group, an aryl group or an aralkyl group, L$^+$ is an ammonium ion, a phosphonium ion or a hetero aromatic ion, and n is an integer of 1 to 5, with the proviso that when L$^+$ is an ammonium ion or a phosphonium ion, n is 4 and four Rs may be the same or different.

Further, according to the present invention, secondly, the above objects and advantages of the present invention are achieved by a thermoplastic resin composition comprising:
(A') 100 parts by weight of thermoplastic resin such as a thermoplastic polyester or an aromatic polycarbonate, and
(B) 0.1 to 10 parts by weight in terms of ash content of layered silicate having, as at least a portion of cations, an organic cation represented by the above formula (I) wherein at least one of Rs is a group represented by the above formula (I-1).

Further, according to the present invention, thirdly, the above objects and advantages of the present invention are achieved by a layered silicate having, as at least a portion of cations, an organic cation represented by the following formula:

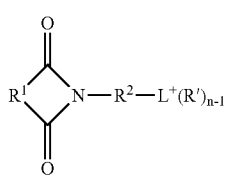

wherein R$^1$ is a divalent hydrocarbon group having 5 to 20 carbon atoms, R$^2$ is a divalent hydrocarbon group having 1 to 20 carbon atoms, R' is a group represented by the following formula (I-1):

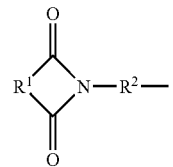

(I-1)

wherein R$^1$ and R$^2$ are the same as defined above, an alkyl group, an aryl group or an aralkyl group, L$^+$ is an ammonium ion, a phosphonium ion or a hetero aromatic ion, and n is 1 to 5.

DETAILED DESCRIPTION OF THE PREFERRED EMBODIMENT

Figure 1:
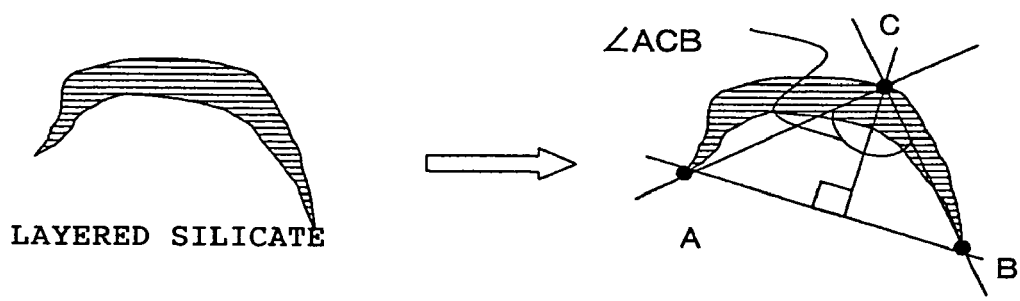
FIG. 1 is a diagram for illustrating ∠ACB in a formula (III) regarding the shape of a layered silicate observed from a cross section of a film.

Hereinafter, the present invention will be described in detail. Firstly, the film of the present invention will be described.

As the thermoplastic resin (A), a thermoplastic polyester or a thermoplastic aromatic polycarbonate is used.

As the thermoplastic polyester, a thermoplastic polyester comprising a dicarboxylic acid component, a diol component and, in some cases, a hydroxycarboxylic acid component is used.

Illustrative examples of the dicarboxylic acid include aromatic dicarboxylic acids such as terephthalic acid, isophthalic acid, ortho-phthalic acid, chlorphthalic acid, nitrophthalic acid, 2,5-naphthalenedicarboxylic acid, 2,6-naphthalenedicarboxylic acid, 2,7-naphthalenedicarboxylic acid, 1,5-naphthalenedicarboxylic acid, 4,4'-biphenyldicarboxylic acid, 2,2'-biphenyldicarboxylic acid, 4,4'-diphenyl ether dicarboxylic acid, 4,4'-diphenylmethanedicarboxylic acid, 4,4'-diphenylsulfonedicarboxylic acid, 4,4'-diphenylisopropylidenedicarboxylic acid, 1,2-bis(4-carboxyphenoxy)-ethane and 5-sodium sulfoisophthalate; aliphatic dicarboxylic acids such as oxalic acid, succinic acid, adipic acid, suberic acid, azelaic acid, sebacic acid, dodecanedioic acid, octadecanedicarboxylic acid, dimer acid, maleic acid and fumaric acid; and alicyclic dicarboxylic acids such as 1,4-cyclohexanedicarboxylic acid. These may be used alone or in combination of two or more.

Illustrative examples of the diol include ethylene glycol, 1,2-propylene glycol, 1,3-trimethylene glycol, 1,3-butanediol, 1,4-butanediol, 2,2-dimethylpropanediol, neopentyl glycol, 1,5-pentanediol, 1,6-hexanediol, 1,8-octanediol, 1,10-decanediol, 1,4-cyclohexanedimethanol, 1,3-cyclohexanedimethanol, 1,2-cyclohexanedimethanol, trimethylene glycol, tetramethylene glycol, pentamethylene glycol, octamethylene glycol, diethylene glycol, dipropylene glycol, biphenol, methylenebisphenol, 4,4'-ethylidenebisphenol, 4,4'-methylenebis(2,6-dimethylphenol), 4,4'-methylenebis(2,6-methylphenol), 4,4'-isopropylidenebisphenol (bisphenol A), 4,4'-isopropylidenebis(2-methylphenol), 4,4'-isopropylidenebis(2,6-dimethylphenol), 4,4'-(1-phenylethylidene)bisphenol, 4,4'-(1-phenylethylidene)bis(2-methylphenol), 4,4'-(1-phenylethylidene)bis(2,6-dimethylphenol), 4,4'-(1-methylpropylidene)bisphenol, 4,4'-(1-methylpropylidene)bis(2-methylphenol), 4,4'-(1-methylpropylidene)bis(2,6-dimethylphenol), 4,4'-cyclopentylidenebisphenol, 4,4'-cyclopentylidenebis(2-methylphenol), 4,4'-cyclopentylidenebis(2,6-dimethylphenol), 4,4'-cyclohexylidenebisphenol, 4,4'-cyclohexylidenebis(2-methylphenol), 4,4'-cyclohexylidenebis(2,6-dimethylphenol), 4,4'-(3,3,5-trimethylcyclohexylidene)bisphenol, 4,4'-(3,3,5-trimethylcyclohexylidene)bis(2-methylphenol), 4,4'-(3,3,5-trimethylcyclohexylidene)bis(2,6-dimethylphenol), 4,4'-(9H-fluorene-9-ylidene)bisphenol, 4,4'-(9H-fluorene-9-ylidene)bis(2-methylphenol), 4,4'-(9H-fluorene-9-ylidene)bis(2,6-dimethylphenol), hydroquinone, resorcinol and 2,2-bis(2'-hydroxyethoxyphenyl)propane. These may be used alone or in combination of two or more. Of these, from the viewpoints of availability and versatility, ethylene glycol, 1,3-trimethylene glycol, 1,4-butanediol, 4,4'-isopropylidenebisphenol (bisphenol A), 4,4'-cyclohexylidenebisphenol, 4,4'-(3,3,5-trimethylcyclohexylidene)bisphenol, 4,4'-(9H-fluorene-9-ylidene)bisphenol and 4,4'-(9H-fluorene-9-ylidene)bis(2-methylphenol) are preferred.

Illustrative examples of the hydroxycarboxylic acid include aromatic hydroxycarboxylic acids such as p-hydroxybenzoic acid, p-hydroxyethoxybenzoic acid, 6-hydroxy-2-naphthoic acid and 4'-hydroxy-biphenyl-4-carboxylic acid. These may be used alone or in combination of two or more.

As the polyester, an aromatic polyester is preferred. Specific examples thereof include a poly(ethylene terephthalate), poly(1,3-trimethylene terephthalate), poly(1,4-butylene terephthalate), poly(1,4-cyclohexylenedimethylene terephthalate), poly(ethylene-2,6-naphthalene dicarboxylate), poly(1,3-trimethylene-2,6-naphthalene dicarboxylate), poly(1,4-butylene-2,6-naphthalene dicarboxylate), poly(ethyleneisophthalate-terephthalate) copolymer, poly(1,4-butyleneisophthalate-terephthalate) copolymer and poly(1,4-cyclohexylenedimethyleneisophthalate-terephthalate) copolymer. Of these, the poly(ethylene terephthalate), poly(1,3-trimethylene terephthalate), poly(1,4-butylene terephthalate) and poly(ethylene-2,6-naphthalene dicarboxylate) are preferred.

The above polyester preferably contains a dialkylene glycol component in an amount of not larger than 5 mol % based on the total of all glycol components. When the amount of the component is larger than 5 mol %, the crystallinity of the polyester deteriorates, and mechanical properties including elastic modulus may significantly deteriorate. The amount of the dialkylene glycol component is more preferably not larger than 4 mol %, much more preferably not larger than 3 mol %, particularly preferably not larger than 2 mol %. The layered silicate to be used in the present invention which will be described later is hardly involved in production of the dialkylene glycol component in the polyester. Thus, even if the polyester is polymerized in the presence of the layered silicate, the production rate of the dialkylene glycol component can be kept low.

The molecular weight of the polyester is preferably 0.1 to 20 dL/g, more preferably 0.2 to 10 dL/g, much more preferably 0.3 to 5 dL/g, in terms of reduced viscosity (value measured in 1.2 g/dL of phenol/1,1,2,2-tetrachloroethane (weight ratio=4/6) solution at 35° C.).

As for the polycarbonate, a polycarbonate based on bisphenol A is preferred out of polycarbonates having a structure that bisphenols are bonded by carbonates. Illustrative examples of bisphenols which are used include biphenol, methylenebisphenol, 4,4'-ethylidenebisphenol, 4,4'-methylenebis(2,6-dimethylphenol), 4,4'-methylenebis(2,6-methylphenol), 4,4'-isopropylidenebisphenol (bisphenol A), 4,4'-isopropylidenebis(2-methylphenol), 4,4'-isopropylidenebis(2,6-dimethylphenol), 4,4'-(1-phenylethylidene)bisphenol, 4,4'-(1-phenylethylidene)bis(2-methylphenol), 4,4'-(1-phenylethylidene)bis(2,6-dimethylphenol), 4,4'-(1-methylpropylidene)bisphenol, 4,4'-(1-methylpropylidene)bis(2-methylphenol), 4,4'-(1-methylpropylidene)bis(2,6-dimethylphenol), 4,4'-cyclopentylidenebisphenol, 4,4'-cyclopentylidenebis(2-methylphenol), 4,4'-cyclopentylidenebis(2,6-dimethylphenol), 4,4'-cyclohexylidenebisphenol, 4,4'-cyclohexylidenebis(2-methylphenol), 4,4'-cyclohexylidenebis(2,6-dimethylphenol), 4,4'-(3,3,5-trimethylcyclohexylidene)bisphenol, 4,4'-(3,3,5-trimethylcyclohexylidene)bis(2-methylphenol), 4,4'-(3,3,5-trimethylcyclohexylidene)bis(2,6-dimethylphenol), 4,4'-(9H-fluorene-9-ylidene)bisphenol, 4,4'-(9H-fluorene-9-ylidene)bis(2-methylphenol) and 4,4'-(9H-fluorene-9-ylidene)bis(2,6-dimethylphenol). Of these, from the viewpoints of availability and versatility, 4,4'-isopropylidenebisphenol-(bisphenol A), 4,4'-cyclohexylidenebisphenol, 4,4'-(3,3,5-trimethylcyclohexylidene)bisphenol, 4,4'-(9H-fluorene-9-ylidene)bisphenol and 4,4'-(9H-fluorene-9-ylidene)bis(2-methylphenol) are preferred.

The molecular weight of the polycarbonate is preferably 0.1 to 20 dL/g, more preferably 0.2 to 10 dL/g, much more preferably 0.3 to 5 dL/g, in terms of reduced viscosity (value measured in 1.2 g/dL of methylene chloride at 20° C.).

The layered silicate (B) has an organic cation represented by the above formula (I), preferably a cation represented by the formula (I) wherein R is a group represented by the above formula (I-1), as at least a portion of cations. The layered silicate (B) can be obtained by exchanging at least a portion of cations of a layered silicate having no organic cation represented by the above formula (I) (hereinafter referred to as "layered silicate before cation-exchanging") with the organic cation represented by the formula (I). The layered silicate before cation-exchanging has a cation exchanging ability and shows a characteristic of swelling by taking in water between layers. Preferred examples thereof include a smectite-based clay mineral, a vermiculite-based clay mineral and a mica-based clay mineral. Specific examples of the smectite-based clay mineral include naturally occurring or chemically synthesized hectorite, saponite, stibunsite, beidellite and montmorillonite, and substitution products, derivatives and mixtures thereof. Further, specific examples of the mica-based clay mineral include chemically synthesized swellable mica having, for example, an Li or Na ion between layers, and substitution products, derivatives and mixtures thereof. Of these, the smectite-based clay mineral is preferred, and montmorillonite is particularly preferred, because it is easily dispersed in the thermoplastic resin. These may be used alone or in combination of two or more.

In the present invention, the organic cation is represented by the following formula (I):

$$(R)_n\text{-}L^+ \quad (I)$$

wherein R is a group represented by the following formula (I-1):

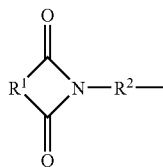

(I-1)

wherein $R^1$ is a divalent hydrocarbon group having 5 to 20 carbon atoms, and $R^2$ is a divalent hydrocarbon group having 1 to 20 carbon atoms, an alkyl group, an aryl group or an aralkyl group. $L^+$ is an ammonium ion, a phosphonium ion or a hetero aromatic ion. n is an integer of 1 to 5, with the proviso that when $L^+$ is an ammonium ion or a phosphonium ion, n is 4 and four Rs may be the same or different.

Illustrative examples of $R^1$ when R is the group represented by the above formula (I-1) include aromatic hydrocarbon groups such as 1,2-phenylene, 3-methyl-1,2-phenylene, 4-methyl-1,2-phenylene, 3-ethyl-1,2-phenylene, 4-ethyl-1,2-phenylene, 3-propyl-1,2-phenylene, 4-propyl-1,2-phenylene, 3-phenyl-1,2-phenylene, 4-phenyl-1,2-phenylene, 3-nitro-1,2-phenylene, 4-nitro-1,2-phenylene, 1,8-naphthalene, 1,2-naphthalene, 2,3-naphthalene, 2-methyl-1,8-naphthalene, 3-methyl-1,8-naphthalene, 4-methyl-1,8-naphthalene, 3-methyl-1,2-naphthalene, 4-methyl-1,2-naphthalene, 5-methyl-1,2-naphthalene, 6-methyl-1,2-naphthalene, 7-methyl-1,2-naphthalene, 8-methyl-1,2-naphthalene, 1-methyl-2,3-naphthalene, 5-methyl-2,3-naphthalene and 6-methyl-2,3-naphthalene; and alicyclic hydrocarbon groups such as 1,2-cyclopentylene, 3-methyl-1,2-cyclopentylene, 4-methyl-1,2-cyclopentylene, 1,2-cyclohexylene, 3-methyl-1,2-cyclohexylene, 4-methyl-1,2-cyclohexylene, 3-ethyl-1,2-cyclohexylene, 4-ethyl-1,2-cyclohexylene, 3-propyl-1,2-cyclohexylene, 4-propyl-1,2-cyclohexylene, 3-phenyl-1,2-cyclohexylene and 4-phenyl-1,2-cyclohexylene. These may be used alone or in combination of two or more.

Illustrative examples of $R^2$ include hydrocarbon groups such as methylene, ethylene, 1,3-trimethylene, 1,4-tetramethylene, 1,5-pentamethylene, 1,2-cyclopentylene, 1,3-cyclopentylene, 1,6-hexamethylene, 1,2-cyclohexylene, 1,3-cyclohexylene, 1,4-cyclohexylene, 1,7-heptamethylene, 1,8-octamethylene, 1,9-nonamethylene, 1,10-decamethylene, 1,11-undecamethylene, 1,12-dodecamethylene, 1,13-tridecamethylene, 1,14-tetradecamethylene, 1,15-pentadecamethylene, 1,16-hexadecamethylene, 1,17-heptadecamethylene, 1,18-octadecamethylene, 1,19-nonadecamethylene and 1,20-decadecamethylene. These may be used alone or in combination of two or more.

Illustrative examples of the alkyl group represented by R include linear alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and decadecyl; and alicyclic alkyl groups such as cyclopropyl, cyclobutyl, cyclopentyl, cyclohexyl, cycloheptyl, cyclooctyl, cyclononyl, cyclodecyl, norbornyl and bicycloundecyl.

Illustrative examples of the aryl group represented by R include phenyl, tolyl and xylyl.

Illustrative examples of the aralkyl group represented by R include benzyl, phenylethyl, phenylpropyl, phenylbutyl, phenylpentyl, phenylhexyl, phenylheptyl, phenyloctyl, phenylnonyl, phenyldecyl, phenylundecyl, phenyldodecyl, phenyltridecyl, phenyltetradecyl, phenylpentadecyl, phenylhexadecyl, phenylheptadecyl, phenyloctadecyl, phenylnonadecyl and phenyldecadecyl.

The above alkyl group, aryl group and aralkyl group may be substituted by a substituent such as a hydroxy group, an alkoxy group, a phenoxy group, an ester group or a carboxylic group.

Suitable examples of alkyl, aryl and aralkyl groups substituted by the substituents include the following groups and isomers thereof. In the following formulae, a and b are an integer of 1 to 30 that the number of carbon atoms in the group is 30 or less, preferably 20 or less, more preferably 15 or less, particularly preferably 10 or less.

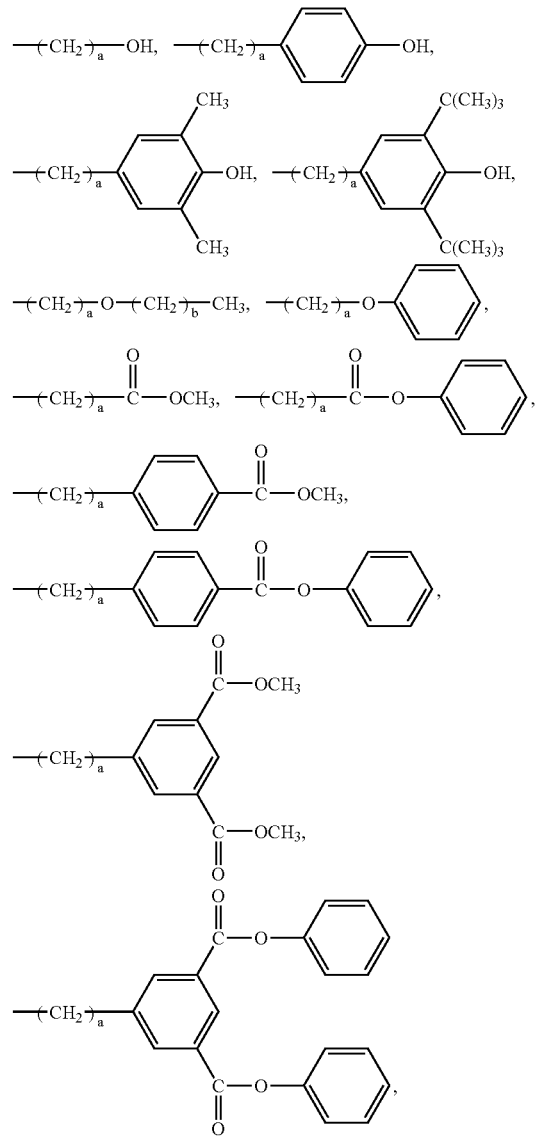

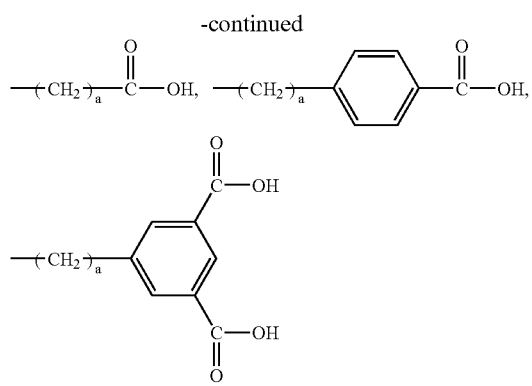

The above substituents may be used alone or in combination of two or more.

Illustrative examples of the ion represented by L⁺ when n=1 include cations derived from amine derivatives such as ammonia, methylamine, ethylamine, propylamine, butylamine, pentylamine, hexylamine, heptylamine, octylamine, nonylamine, decylamine, undecylamine, dodecylamine, dimethylamine, diethylamine, dipropylamine, dibutylamine, dipentylamine, dihexylamine, diheptylamine, dioctylamine, dinonylamine, didecylamine, diundecylamine, didodecylamine, trimethylamine, triethylamine, tripropylamine, tributylamine, tripentylamine, trihexylamine, triheptylamine, trioctylamine, trinonylamine, tridecylamine, triundecylamine and tridodecylamine; cations derived from phosphine derivatives such as trimethylphosphine, triethylphosphine, tripropylphosphine, tributylphosphine, tripentylphosphine, trihexylphosphine, triheptylphosphine, trioctylphosphine, trinonylphosphine, tridecylphosphine, triphenylphosphine and tritolylphosphine; cations derived from pyridine derivatives such as pyridine, methylpyridine, ethylpyridine, dimethylpyridine, hydroxypyridine and dimethylaminopyridine; cations derived from imidazole derivatives such as imidazole, methylimidazole, dimethylimidazole, ethylimidazole and benzimidazole; cations derived from pyrazole derivatives such as pyrazole, methylpyrazole, dimethylpyrazole, ethylpyrazole and benzpyrazole; cations derived from triazole derivatives such as triazole, methyltriazole, dimethyltriazole, ethyltriazole and benztriazole; and cations derived from tetrazole derivatives such as tetrazole, methyltetrazole, dimethyltetrazole, ethyltetrazole and benztetrazole. Further, illustrative examples of the ion represented by L⁺ when n=2, 3, 4 and 5 include derivatives resulting from reducing the number of substituents such as hydrogen, an alkyl group and a phenyl group contained in the above derivatives by 1, 2, 3 and 4, respectively. More specifically, the following structures are available according to n.

when n=2:

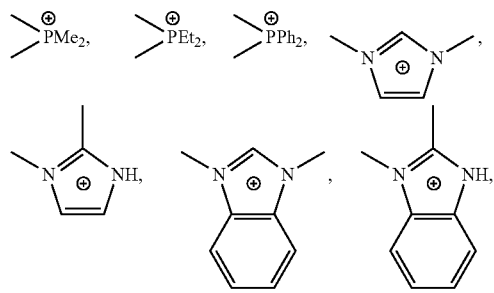

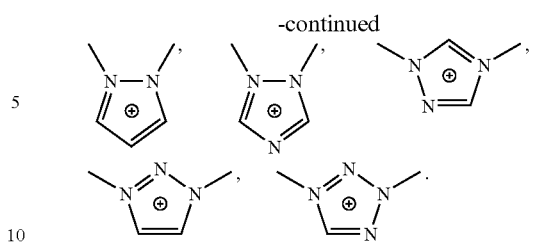

when n=3:

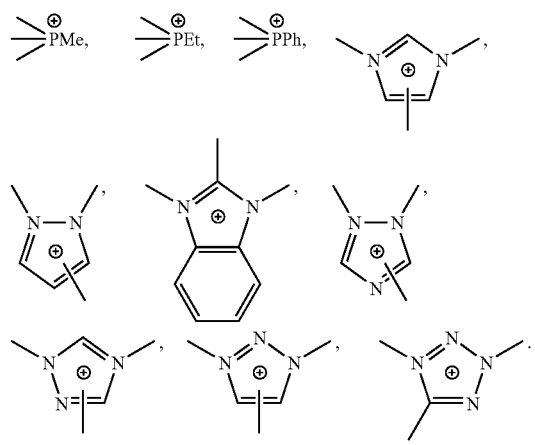

when n=4:

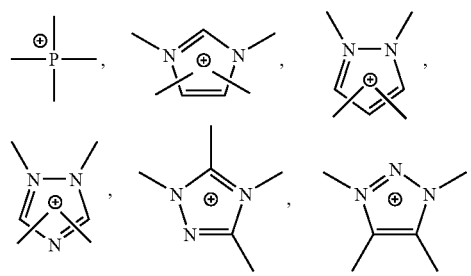

when n 5:

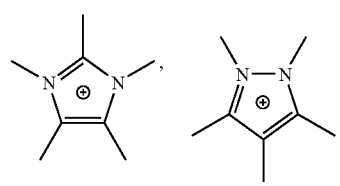

Of these, organic cations derived from the phosphine, pyridine, imidazole, pyrazole and amine derivatives are preferred because they have high heat-resistance and are easily available, and the cations derived from the imidazole derivatives are particularly preferred. These may be used alone or in combination of two or more.

As a method of cation-exchanging the layered silicate with the organic cation, a conventionally known method can be used. For example, a solution obtained by dispersing the layered silicate before cation-exchanging in water and a solution of a compound comprising the organic cations and pairing anions are mixed together by agitation, and the layered silicate is then separated from the medium by a method such as filtration or centrifugal separation and washed. By this method, at least a portion of cations such as sodium contained in the layered silicate before cation-exchanging is substituted with the organic cations, thereby obtaining the layered silicate cation-exchanged with the organic cations.

It can be known that the layered silicate has been cation-exchanged with the organic cations, from a change in a distance between layers of the layered silicate between before and after cation-exchanging and from a change in an exchange rate (cation exchange rate) between the cations contained in the layered silicate and the organic cations between before and after cation-exchanging.

The change in the distance between the layers between before and after cation-exchanging can be easily measured from a change in a diffraction angle derived from diffraction between the layers by measurement such as X-ray diffraction. The cation exchange percentage in the present invention can be determined from the following formula (VI) once the change in the distance between the layers is confirmed.

Cation Exchange Percentage (%)=$\{Wf/(1-Wf)\}/(M_{org}/M_{si})\times 100$     (VI)

(Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge. The molecular weight per charge in the layered silicate is a value calculated by a reciprocal of the cation exchange capacity (unit: gram equivalent or eq/100 g) of the layered silicate.)

The cation exchange rate is preferably 50 to 200%. When the cation exchange rate is low, dispersibility of the layered silicate when mixed with the thermoplastic resin may be low. Meanwhile, when the cation exchange rate is too high, the content of organic onium cation in the cation-exchanged layered silicate becomes so high that the properties of the thermoplastic resin are rather impaired. When the cation exchange rate used is higher than 100%, it is conceived that an intermolecular force such as hydrogen bonding works between the organic onium ions. The cation exchange rate is more preferably 55 to 170%, much more preferably 60 to 150%, particularly preferably 63 to 130%.

The cation-exchanged layered silicate preferably has a thermal decomposition temperature of 310° C. or higher. The thermal decomposition temperature is a temperature when a reduction in weight measured by a thermogravimetric analysis in a nitrogen atmosphere at a temperature increasing rate of 20° C./min is 5 wt %. When the thermal decomposition temperature is lower than 310° C., the layered silicate is liable to be decomposed when mixed with the thermoplastic resin, and the properties of the composition may be significantly degraded. The thermal decomposition temperature is more preferably 320° C. or higher, much more preferably 330° C. or higher, particularly preferably 340° C. or higher.

The thermoplastic resin composition for producing the film of the present invention comprises the above thermoplastic resin (A) and the above cation-exchanged layered silicate (B), and the amount of the cation-exchanged layered silicate is 0.1 to 10 parts by weight in terms of ash content based on 100 parts by weight of the thermoplastic resin. When the amount of the cation-exchanged layered silicate is too small, such effects as an improvement in mechanical properties and an improvement in dimensional stability by addition of the layered silicate are not exhibited, while when the amount is too large, the layered silicate forms large agglomerates and therefore degrades the above physical properties, or even if the silicate manages to disperse, the viscosity of the composition becomes so high that moldability deteriorates undesirably. The amount of the cation-exchanged layered silicate, in terms of the amount of an inorganic component or ash, is preferably 0.3 to 8 parts by weight, more preferably 0.5 to 7 parts by weight, much more preferably 0.8 to 6 parts by weight, based on 100 parts by weight of the thermoplastic resin. The weight ratio between the thermoplastic resin and the ash of the cation-exchanged layered silicate can be determined from a change in the weight of the film between before and after thermal decomposition by use of a thermogravimetric analysis. More specifically, the thermoplastic resin and the organic cations of the layered silicate are completely decomposed by heating at about 800° C., and only the inorganic component of the layered silicate remains after the decomposition. Thus, the weight ratio in terms of the inorganic component or ash can be determined from the weight loss after the decomposition.

In the film of the present invention, the cation-exchanged layered silicate is preferably dispersed in the thermoplastic resin as a matrix in small number of layers. More specifically, the thickness in a cross sectional direction of the layered silicate can be calculated by use of the diffraction angle and full width of half maximum intensity of a diffraction peak attributable to diffraction between the layers of the layered silicate by X-ray diffraction.

As a method of determining the thickness from the full width of half maximum intensity, the following Scherrer's formula is used.

$D=K\cdot\lambda/\beta\cos\theta$

D: size of crystallite
$\lambda$: wavelength of measuring X-ray
$\beta$: full width of half maximum intensity
$\theta$: Bragg angle of diffraction line
K: Scherrer constant The thus obtained thickness of the layered silicate in the film cross sectional direction is preferably 3 to 100 nm. When the layered silicate is exfoliated to a single layer, the thickness cannot be detected by the method. However, it is sufficient for the object of the present invention if it can be confirmed in the above measurement that the thickness is 3 to 100 nm. As for the thickness of the layered silicate, a exfoliated silicate may be contained in the composition as long as film formability and flowability are not impaired. When the thickness in the film cross sectional direction of the layered silicate is smaller than 3 nm, the layered silicate has two layers or less and is difficult to disperse. Meanwhile, when the thickness of the layered silicate is larger than 100 nm, dispersion is insufficient, so that the effect of improving physical properties by dispersing the layered silicate becomes small. The thickness of the layered silicate in the film cross sectional direction is more preferably 4 to 50 nm, much more preferably 5 to 30 nm, particularly preferably 6 to 15 nm.

A method for producing the film of the present invention is not limited to a particular method, and a conventionally known method is used. Illustrative examples of the method are a melt extrusion method such as a method comprising polymerizing the thermoplastic resin in the presence of the cation-exchanged layered silicate so as to produce the thermoplastic resin composition and melt-extruding the composition from a T die and a method comprising mixing the cation-exchanged layered silicate and the thermoplastic resin together by use of a twin-screw extruder or the like and melt-extruding the mixture from a T die, and a solution casting method such as a method comprising dissolving the cation-exchanged layered silicate and the thermoplastic resin in a medium such as a solvent so as to prepare a solution, casting the solution and then removing the solvent. Of these, the melt extrusion method is preferred from the viewpoint of high productivity. The temperature at which the film is produced by the melt extrusion method preferably ranges from the glass transition temperature of the thermoplastic resin to 350° C., more preferably from (the glass transition temperature+50)° C. to 330° C., much more preferably from (the glass transition temperature+80)° C. to 320° C. When the temperature is much lower than the glass transition temperature, mixing becomes difficult undesirably, while when the temperature is much higher than 350° C., decomposition of the thermoplastic resin may become intense. Further, the retention time at the above temperature is preferably 1 minute to 10 hours, more preferably 1 minute to 8 hours, much more preferably 1 minute to 6 hours. When the retention time is too short, mixing is insufficient and the layered silicate is not dispersed easily, while when it is too long, thermal degradation of the thermoplastic resin may become liable to occur. The above layered silicate used in the present invention has high dispersibility in the thermoplastic resin. Thus, a film having excellent dispersibility can be obtained.

The film of the present invention is preferably monoaxially or biaxially oriented. Orientation can be evaluated independently on the thermoplastic resin and the layered silicate by X-ray diffraction of the film, observation of the film under a transmission electron microscope, et al.

In X-ray diffraction when X-ray is irradiated in a perpendicular direction of a cross section of the film, an orientation factor f which corresponds to a diffraction peak with the highest intensity among diffractions from the layered silicate preferably satisfies the following formula (II):

$$0.6 \leq f \leq 1 \tag{II}$$

wherein $$f = \frac{3\langle\cos^2\phi\rangle - 1}{2}$$

$$\langle\cos^2\phi\rangle = \frac{\int_0^{\frac{\pi}{2}} I(\phi)\cos^2\phi\sin\phi\, d\phi}{\int_0^{\frac{\pi}{2}} I(\phi)\sin\phi\, d\phi}$$

φ represents an azimuthal angle (degree), and I(φ) represents diffraction intensity at the azimuthal angle φ.

The orientation factor f in the above formula (II) is a generally used indicator which expresses the degree of orientation of, for example, crystals of a polymer, and it is described on, for example, page 1,604 in Ran et al., Polymer, Vol. 42, pages 1,601 to 1,612 (2001). When the orientation factor f fails to satisfy the above formula (II) with respect to the orientation of the layered silicate, the effects of improving mechanical properties such as elastic modulus and dimensional stability which are expected by addition of the layered silicate may not be exerted sufficiently. In the above formula (II), the value of f more preferably satisfies $0.7 \leq f \leq 1$, much more preferably $0.8 \leq f \leq 1$, particularly preferably $0.85 \leq f \leq 1$.

Further, in X-ray diffraction when X-ray is irradiated in a perpendicular direction of a cross section of the film, an orientation factor f which corresponds to a diffraction peak with the highest intensity among diffractions from crystals of the polyester preferably satisfies the following formula (II'):

$$0.3 \leq f \leq 1 \tag{II'}$$

wherein f is the same as defined above.

When the orientation factor f fails to satisfy the above formula (II') with respect to orientation of the polyester, the effect of improving mechanical properties such as elastic modulus which is expected by addition of the layered silicate may not be exerted sufficiently. In the above formula (II'), the value of f more preferably satisfies $0.4 \leq f \leq 1$, much more preferably $0.5 \leq f \leq 1$, particularly preferably $0.6 \leq f \leq 1$.

A production method of the thermoplastic film which satisfies the above formula (II) or formulae (II) and (II') is not particularly limited as long as it is a method which satisfies the above formula (II) or formulae (II) and (II'). It is suitably achieved by stretching the film of the present invention. A suitable stretching method can be a method of monoaxially or biaxially stretching the film sequentially or simultaneously. More specifically, the stretch temperature preferably ranges from the glass transition point of the thermoplastic resin-to (the glass transition point+100° C.), more preferably from the glass transition point of the thermoplastic resin to (the glass transition point+80° C.), much more preferably from the glass transition point to (the glass transition point+70° C.). When the stretch temperature is too low or too high, it may become difficult to produce a uniform film. Further, the stretch ratio is preferably 1.1 to 100 times, more preferably 1.3 to 90 times, much more preferably 1.5 to 80 times. When the stretch ratio is too low, it may become difficult to orient the thermoplastic resin or the layered silicate. Meanwhile, when the stretch ratio is too high, the film may become liable to break. The stretch ratio in the present invention is a value represented by (area of film after stretching)/(area of film before stretching). Further, the stretch rate is preferably 0.01/min to 10,000/min, more preferably 0.05/min to 8,000/min, much more preferably not higher than 5,000/min. When the stretch rate is lower than 0.01/min, an oriented state is relaxed during stretching and may not be able to be retained. Meanwhile, when the stretch rate is higher than 10,000/min, the film may become liable to break. The stretch rate in the present invention is a value represented by (area of film after stretching)/(area of film before stretching)/time(min).

Further, in the present invention, in the orientation of the layered silicate, the shape of the layered silicate observed from a cross section of the film preferably satisfies the following formula (III):

$$120° \leq (\angle ACB)\text{ave} \leq 180° \tag{III}$$

wherein A, B and C are points in one layered silicate, A and B are both end points in a longitudinal direction of the layered silicate, C is the farthest point from the straight line connecting A to B, ∠ACB is an angle (°) formed by the line AC and the line BC, and (∠ACB)ave is the average of ∠ACB which is obtained from 10 layered silicates with the first to tenth largest distances between the points A and B that are contained in a cross sectional area of 10 μm². The above 10 layered silicates contained in the cross sectional area of 10 μm² preferably have a distance between the points A and B of at least 100 nm.

The points A to C and ∠ACB in the above formula (III) are exemplified in attached FIG. 1.

When (∠ACB)ave deviates from the range of the above formula (III), the effect of improving elastic modulus by the layered silicate may become difficult to be exerted. (∠ABC) ave more preferably satisfies 130°≦(∠ABC)ave≦180°, much more preferably 140°≦(∠ABC)ave≦180°, particularly preferably 150°≦(∠ABC)ave≦180°.

Further, as in the above case, the shape of the cation-exchanged layered silicate observed from a cross section of the film preferably satisfies the following formula (IV):

$$0 \leq \sigma(\angle A^*B\ D^*E) \leq 16 \quad (IV)$$

wherein A and B are points in one layered silicate and end points in a longitudinal direction of the layered silicate, A*B is the straight line connecting the point A to the point B, D*E is a reference straight line prepared on the cross section of the film, ∠A*B D*E is an acute angle (°) formed by A*B and D*E, and σ(∠A*B D*E) is the standard deviation of ∠A*B D*E which is determined for 10 layered silicates with the first to tenth largest distances between the points A and B that are contained in a cross sectional area of 10 μm².

Figure 2:
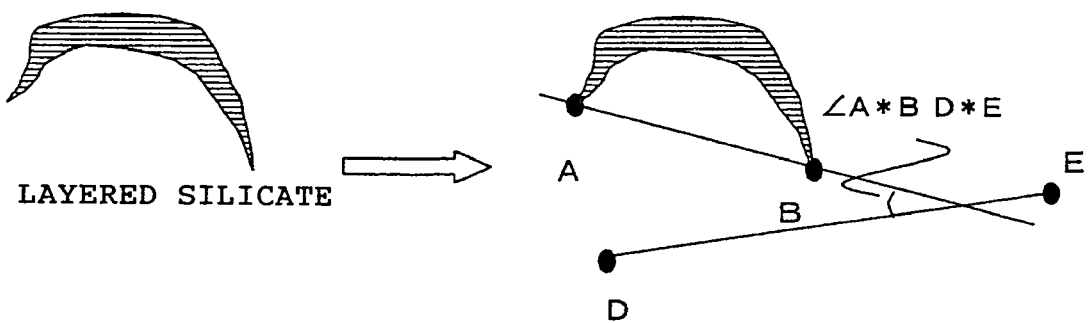
FIG. 2 is a diagram for illustrating ∠A*B D*E in a formula (IV) regarding the shape of a layered silicate observed from a cross section of a film.

The points A to E and ∠A*B D*E in the above formula (IV) are exemplified in attached FIG. 2.

One reference straight light D*E is prepared for layered silicates in the cross sectional area of 10 μm² of the film of the present invention. D*E is a line which forms an angle together with A*B of each layered silicate, and where D*E is prepared is not particularly limited as long as it exists on the same plane (or the same film cross section) as A*B.

When σ(∠A*B D*E) deviates from the range of the above formula (IV), the effect of improving elastic modulus by the layered silicate may become difficult to be exerted. σ(∠A*B D*E) more preferably satisfies 0≦σ(∠A*B D*E)≦12, much more preferably 0≦σ(∠A*B D*E)≦10, particularly preferably 0≦σ(∠A*B D*E)≦8.

Further, it is more preferable to satisfy the above formulae (III) and (IV) simultaneously.

A production method of the film which satisfies the above formula (III) or (IV) is not particularly limited as long as it is a method which satisfies the above formula (III) or (IV). It is suitably achieved by forming and stretching the film of the present invention. As a suitable stretching method, a method of monoaxially or biaxially stretching the film sequentially or simultaneously can be named. More specifically, the stretch temperature preferably ranges from the glass transition point of the thermoplastic resin to (the glass transition point+90° C.), more preferably from the glass transition point of the thermoplastic resin to (the glass transition point+70° C.), much more preferably from the glass transition point to (the glass transition point+60° C.). When the stretch temperature is too low or too high, it may become difficult to produce a uniform film. The stretch ratio is preferably 1.2 to 100 times, more preferably 1.4 to 90 times, much more preferably 1.6 to 80 times. When the stretch ratio is too low, it is difficult to orient the layered silicate so as to satisfy at least one of the above formulae (III) and (IV) undesirably. Meanwhile, when the stretch ratio is too high, the film may become liable to break. Further, the stretch rate is preferably 0.001/min to 10,000/min, more preferably 0.005/min to 8,000/min, much more preferably 0.01/min to 5,000/min. When the stretch rate is lower than 0.001/min, an oriented state is loosened during stretching and cannot be retained undesirably. Meanwhile, when the stretch rate is higher than 10,000/min, the film may become liable to break. In addition, when the film of the present invention is a polyester film, crystals of the polyester are preferably heat-set by a heat treatment after production or orientation by stretching of the film. The heat treatment temperature preferably ranges from the glass transition point of the polyester to the melting point of the polyester, more preferably from (the glass transition point+20° C.) to (the melting point−10° C.), much more preferably from (the glass transition point+30° C.) to (the melting point−20° C.). Further, the heat treatment time is preferably 1 second to 10 minutes, more preferably 5 seconds to 9 minutes, much more preferably 10 seconds to 8 minutes. Further, during the heat treatment, it is preferable to hold the film so as to prevent loosening of orientation from occurring.

The thus obtained film is excellent in mechanical properties and dimensional stability and can be widely used in a variety of applications, e.g., for electric and electronic materials including a magnetic recording medium, an electronic mount board and a capacitor, for packing, for medical use and for various industrial materials.

As described above, the thermoplastic resin composition for producing the film of the present invention uses a thermoplastic polyester or a thermoplastic aromatic polycarbonate as the thermoplastic resin. According to the studies made by the present inventor(s), it has been found that a resin composition containing a specific layered silicate out of the above layered silicates is excellent in heat resistance, a gas barrier property, flame retardancy, elasticity and tenacity and used in productions of various molded articles, fibers and films even when using various other thermoplastic resins in place of the above thermoplastic resins.

Thus, according to the present invention, as described above, a thermoplastic resin composition is provided that comprises 100 parts by weight of the thermoplastic resin (A') and 0.1 to 10 parts by weight in terms of ash content of the layered silicate having, as at least a portion of cations, the organic cation represented by the above formula (I) wherein at least one of Rs is represented by the above formula (I-1).

Illustrative examples of the thermoplastic resin include a polyolefin such as a polyethylene, a polypropylene and a polystyrene, a polyarylate, a polyamide, a polyimide, a polyetherimide, a polyether, a polyketone, a polyetherketone, a polysulfide, a polysulfone and a polyethersulfone, in addition to the aforementioned polyester and aromatic polycarbonate. Of these, the polyester, aromatic polycarbonate, polyamide, polyimide, polyetherketone, polyether, polysulfide, polysulfone and polyethersulfone are preferred since these can particularly cause a layered silicate having high heat resistance to exhibit its properties.

Illustrative examples of the polyamide include a condensation product obtained from a diamine and a carboxylic acid or an aminocarboxylic acid.

Illustrative examples of suitable compounds of the diamine include aliphatic diamines such as methylene diamine, ethylene diamine, trimethylene diamine, tetramethylene diamine, pentamethylene diamine, hexamethylene diamine, heptamethylene diamine, octamethylene diamine, nonamethylene diamine, decamethylene diamine, undecamethylene diamine, dodecamethylene diamine, tridecamethylene diamine, tetradecamethylene diamine, pentadecamethylene diamine, hexadecamethylene diamine, heptadecamethylene diamine, octadecamethylene diamine, nonadecamethylene diamine and decadecamethylene diamine; and aromatic diamines such as o-phenylene diamine, m-phenylene diamine, p-phenylene diamine, 2,2'-diamino biphenyl, 3,3'-diamino biphenyl, 4,4'-diamino biphenyl, 3,4'-diamino biphenyl, 2,2'-diamino diphenyl ether, 3,3'-diamino diphenyl ether, 4,4'-diamino diphenyl ether, 3,4'-diamino diphenyl ether, 2,2'-diamino diphenyl ketone, 3,3'-diamino diphenyl ketone, 4,4'-diamino diphenyl ketone, 3,4'-diamino diphenyl ketone, 2,2'-diamino diphenyl methane, 3,3'-diamino diphenyl methane, 4,4'-diamino diphenyl methane and 3,4'-diamino diphenyl methane.

Suitable examples of the dicarboxylic acid include aromatic dicarboxylic acids such as terephthalic acid, isophthalic acid, ortho-phthalic acid, chlorphthalic acid, nitrophthalic acid, 2,5-naphthalenedicarboxylic acid, 2,6-naphthalenedicarboxylic acid, 2,7-naphthalenedicarboxylic acid, 1,5-naphthalenedicarboxylic acid, 4,4'-biphenyldicarboxylic acid, 2,2'-biphenyldicarboxylic acid, 4,4'-diphenyl ether dicarboxylic acid, 4,4'-diphenylmethanedicarboxylic acid, 4,4'-diphenylsulfonedicarboxylic acid, 4,4'-diphenylisopropylidenedicarboxylic acid, 1,2-bis(4-carboxyphenoxy)-ethane and 5-sodium sulfoisophthalate; aliphatic dicarboxylic acids such as oxalic acid, succinic acid, adipic acid, suberic acid, azelaic acid, sebacic acid, dodecanedioic acid, octadecanedicarboxylic acid, dimer acid, maleic acid and fumaric acid; and alicyclic dicarboxylic acids such as 1,4-cyclohexanedicarboxylic acid.

Suitable examples of the aminocarboxylic acid include aminoacetic acid, 2-aminopropionic acid, 3-aminopropionic acid, 2-aminobutyric acid, 3-aminobutyric acid, 4-aminobutyric acid, 5-aminopentanoic acid, 6-aminohexanoic acid, 7-aminoheptanoic acid, 8-aminooctanoic acid, 9-aminononanoic acid, 10-aminodacanoic acid, 11-aminoundecanoic acid and 12-aminododecanoic acid. These may be used alone or in admixture of two or more.

Illustrative examples of the polyimide and polyetherimide include semi-aromatic polyimides such as a poly(ethylenepyromellitimide), a poly(butylenepyromellitimide), a poly(hexamethylenepyromellitimide), a poly(octamethylenepyromellitimide), a poly(dodecamethylenepyromellitimide), a poly(trimethylhexamethylenepyromellitimide) and a poly(isophoronylenepyromellitimide); and a polyetherimide (product of GE Plastics Co., Ltd., trade name: ULTEM). These may be used alone or in admixture of two or more.

As the polyether, a conventionally known polyether having recurring units in which aromatic groups are connected by an ether linkage can be used. Illustrative examples of such a polyether include a poly(1,4-phenylene)ether, a poly(2,6-dimethyl-1,4-phenylene)ether, a poly(2-methyl-6-ethyl-1,4-phenylene)ether, a poly(2,6-diethyl-1,4-phenylene)ether, a poly(2-ethyl-6-n-propyl-1,4-phenylene)ether, a poly(2,6-di-n-propyl-1,4-phenylene)ether, a poly(2-methyl-6-n-buthyl-1,4-phenylene)ether, a poly(2-ethyl-6-isopropyl-1,4-phenylene)ether, a poly(2-methyl-6-chloroethyl-1,4-phenylene)ether and a poly(2-methyl-6-hydroxyethyl-1,4-phenylene)ether. These may be used alone or in admixture of two or more.

As the polyetherketone, conventionally known polyetherketones described in U.S. Pat. Nos. 3,953,400, 4,320,224 and 4,709,007 can be used. Illustrative examples of the polyetherketone include polyetherketones having at least one of recurring units represented by the following formulae.

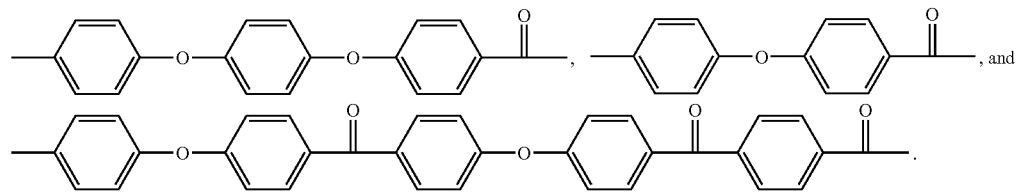

These may be used alone or in admixture of two or more.

As the polysulfide, a conventionally known polysulfide having recurring units in which aromatic groups are connected by a sulfide linkage can be used. An example of such a polysulfide is a poly(1,4-phenylene)sulfide. As the polysulfone and polyethersulfone, conventionally known polysulfone and polyethersulfone in which a diphenylsulfone unit forms a portion of the main chain of the polymer can be used. Illustrative examples of the polysulfone and polyethersulfone include those having at least one of recurring units represented by the following formulae.

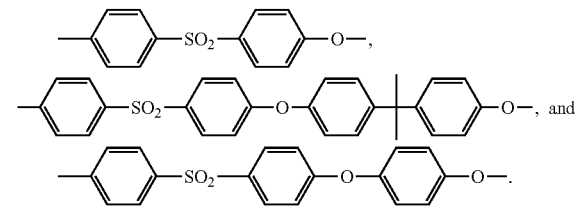

These may be used alone or in admixture of two or more.

Further, the layered silicate having, as at least a portion of cations, the organic cation represented by the above formula (I) wherein at least one of Rs is represented by the above formula (I-1) is as described above. Further, it is to be understood that the above description is directly applied to what is not described herein.

In the thermoplastic resin composition of the present invention, the layered silicate preferably has the organic cation such that a cation exchange percentage (%) represented by the following formula (VI) is 50 to 200.

Cation Exchange Percentage (%)=$\{Wf/(1-Wf)\}/(M_{org}/M_{si})\times100$     (VI)

(Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge. The molecular weight per charge in the layered silicate is a value calculated by a reciprocal of the cation exchange capacity (unit: gram equivalent or eq/100 g) of the layered silicate.)

Further, as the modified layered silicate, a modified layered silicate having a thermal decomposition temperature of not lower than 310° C. is preferably used. More specifically, the layered silicate is preferably smectite, vermiculite or mica in which at least a portion of cations has been replaced by the organic cation.

Further, the above layered silicate used in the above thermoplastic resin composition has, as at least a portion of cations, an organic cation-represented by the following formula:

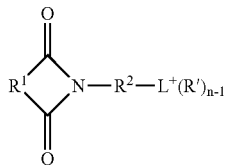

wherein $R^1$ is a divalent hydrocarbon group having 5 to 20 carbon atoms, $R^2$ is a divalent hydrocarbon group having 1 to 20 carbon atoms, R' is a group represented by the following formula (I-1):

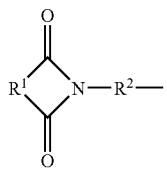

(I-1)

wherein $R^1$ and $R^2$ are the same as defined above, an alkyl group, an aryl group or an aralkyl group, $L^+$ is an ammonium ion, a phosphonium ion or a hetero aromatic ion, and n is 1 to 5.

The layered silicate is a novel compound provided by the present invention.

The layered silicate is an example of the layered silicate represented by the above formula (I), and it is to be understood that the above description is directly applied to what is not described herein.

Of these layered silicates, a layered silicate is preferred that has the organic cation such that a cation exchange percentage (%) represented by the following formula (VI) is 50 to 200.

Cation Exchange Percentage (%)={$Wf/(1-Wf)$}/ ($M_{org}/M_{si}$)×100  (VI)

(Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge. The molecular weight per charge in the layered silicate is a value calculated by a reciprocal of the cation exchange capacity (unit: gram equivalent or eq/100 g) of the layered silicate.) Further, the layered silicate preferably has a thermal decomposition temperature of not lower than 310° C. and is preferably smectite, vermiculite or mica in which at least a portion of cations has been replaced by the organic cation.

EXAMPLES

Hereinafter, the present invention will be further described by use of Examples. However, the present invention shall not be limited by these Examples in any way.
(1) Layered silicate: Montmorillonite (product of KUNIMINE CO., LTD., KUNIPIA F (cation exchange capacity: 0.109 eq/100 g)) was used. The distance between layers was 12.6 Å. The molecular weight per fi charge in the cation portion of the layered silicate was 917.
(2) Cation Exchange Percentage: The cation exchange percentage was calculated, by use of the following formula (VI), from a weight reduction rate from 120° C. to 800° C. when the layered silicate was heated to 800° C. in a nitrogen atmosphere at 20° C./min by use of a thermogravimetric analysis TG8120 of RIGAKU CO., LTD.

Cation Exchange Percentage (%)={$Wf/(1-Wf)$}/ ($M_{org}/M_{si}$)×100  (VI)

(Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge. The molecular weight per charge in the layered silicate is a value calculated by a reciprocal of the cation exchange capacity (unit: gram equivalent or eq/100 g) of the layered silicate.)
(3) Weight Ratio of Thermoplastic Resin to Layered silicate in terms of Ash in Resin Composition: The weight ratio was calculated from a weight loss when the layered silicate was heated to 800° C. in the air at 20° C./min by use of a thermogravimetric analysis TG8120 of RIGAKU CO., LTD.
(4) Thermal Decomposition Temperature: The temperature at which weight loss of 5 wt % was observed when the layered silicate was heated to 800° C. in a nitrogen atmosphere at 20° C./min by use of a thermogravimetric analysis TG8120 of RIGAKU CO., LTD. was determined.
(5) Thickness in Cross Sectional Direction of Layered silicate: The thickness in a cross sectional direction of the layered silicate was calculated from the following Scherrer's formula by use of the diffraction angle and full width of half maximum intensity of a diffraction peak attributable to diffraction between the layers of the layered silicate by X-ray diffraction by use of a powder. X-ray diffractometer RAD-B of RIGAKU CO., LTD.

$D = K·\lambda/\beta \cos \theta$

D: size of crystallite
$\lambda$: wavelength of measuring X-ray
$\beta$: full width of half maximum intensity
$\theta$: Bragg angle of diffraction line
K: Scherrer constant (calculated as 0.9)
(6) Reduced Viscosity ($\eta$sp/C): The reduced viscosity was measured at a concentration of 1.2 g/dL and a temperature of 35° C. by use of a solution of phenol/tetrachloroethane (weight ratio=4:6).
(7) Tensile Modulus: The tensile modulus was measured by use of UCT-1T of ORIENTECH CO., LTD.
(8) Linear Expansion Coefficient: The value of a linear expansion coefficient at 30 to 150° C. was measured by use of TMA2940 of TA Instruments Co., Ltd.
(9) Orientation Factor f: X-ray (Cu-kα radiation) was irradiated from a direction perpendicular to the cross sectional direction of the film by use of a powder X-ray diffractometer RAD-B of RIGAKU CO., LTD. The orientation factor f was determined for a diffraction peak derived from the layered silicate.
(10) Distance between Layers of Layered silicate and Average Number of Layers: The distance between layers of the layered silicate and the average number of layers were calculated from a diffraction peak point in the same manner as in (5) by use of a powder X-ray diffractometer RAD-B of RIGAKU CO., LTD.

(11) Evaluation of Shape of Layered silicate: The shape of the layered silicate was observed from the cross sectional direction of the film by use of a transmission electron microscope H-800 of Hitachi, Ltd.

Reference Example 1

Synthesis of Phthalimidedecamethyleneimidazolium Bromide (Following Formula)

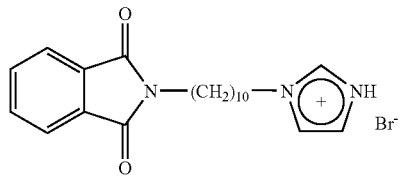

85 parts by weight of phthalimide potassium, 1,008 parts by weight of 1,10-dibromodecane and 430 parts by weight of (fully dehydrated) dimethyl formamide were charged into a flask, stirred, and heated at 100° C. for 20 hours. After heating, volatile components were all removed, and the residue was extracted with xylene. Volatile components were distilled off from the extracted solution, and the residue was left to stand at room temperature so as to obtain crystals of 10-bromodecamethylphthalimide. 3.5 parts by weight of 10-bromodecamethylphthalimide and 0.7 parts by weight of imidazole were charged into a flask and heated at 100° C. for 10 hours so as to obtain phthalimidedecamethyleneimidazolium bromide.

Example 1

Synthesis of Cation-Exchanged Layered Silicate 5.0 parts by-weight of montmorillonite and 400 parts by weight of water were charged into a flask and stirred under heating at 50° C. To the mixture, a solution obtained by dissolving 3.7 parts by weight of phthalimidedecamethyleneimidazolium bromide in 50 parts by weight of methanol was added, and the mixture was further stirred at 50° C. for 3 hours. Solids were separated from the mixture by filtration, washed with water and methanol alternately three times each and then dried so as to obtain a cation-exchanged layered silicate (abbreviated as IC10I-M). The cation exchange rate of IC10I-M was 127%, the thermal decomposition temperature was 338° C., and the distance between layers was 26.8 Å.

Example 2

Polymerization of Composition 250 parts by weight of 2,6-bis(hydroxyethyl)naphthalene dicarboxylate, 22 parts by weight of the layered silicate IC10I-M obtained in Example 1 and 0.04 parts by weight of antimony trioxide were charged into a flask and heated from 230° C. to 290° C. over 2 hours at a normal pressure under agitation. Then, the pressure was reduced from the normal pressure to 0.5 Torr over 1 hour at 290° C., and the mixture was polymerized at the pressure for 1 hour so as to give a composition comprising a poly(ethylene-2,6-naphthalenedicarboxylate) and the layered silicate. The weight ratio between the poly(ethylene-2,6-naphthalenedicarboxylate) and the layered silicate in terms of ash in the composition was 100:7. The melting point of the composition was 265° C., and its reduced viscosity was 0.56 dL/g.

Example 3

Figure 3:
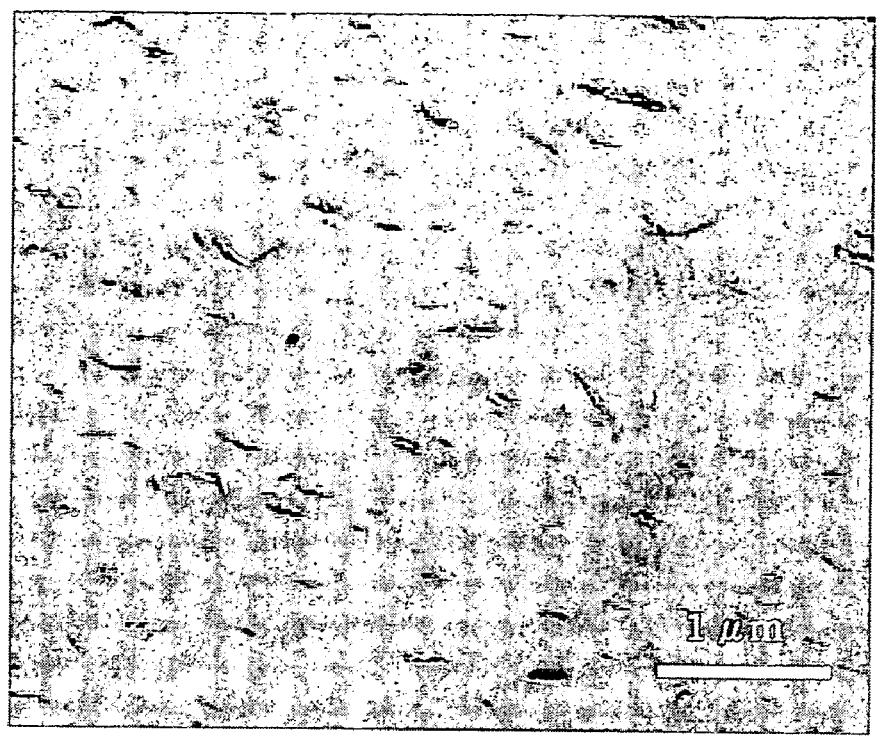
FIG. 3 is a photograph observed from a cross section of a polyester film produced in Example 3, wherein dark portions represent a cation-exchanged layered silicate.

2,240 parts by weight of poly(ethylene-2,6-naphthalate) (reduced viscosity: 0.78 g/dL) and 860 parts by weight of the composition obtained in Example 2 were mixed together and dried at 170° C. for 6 hours. The mixture was fed to an extruder, melt-kneaded at a melt temperature of 300° C. and extruded onto a cooling drum of 80° C. from a 1-mm-wide slit die so as to give a film. The properties of the obtained film are shown in Table 1. Further, a photograph of the film observed from a cross sectional direction is shown in FIG. 3.

Example 4

Figure 4:
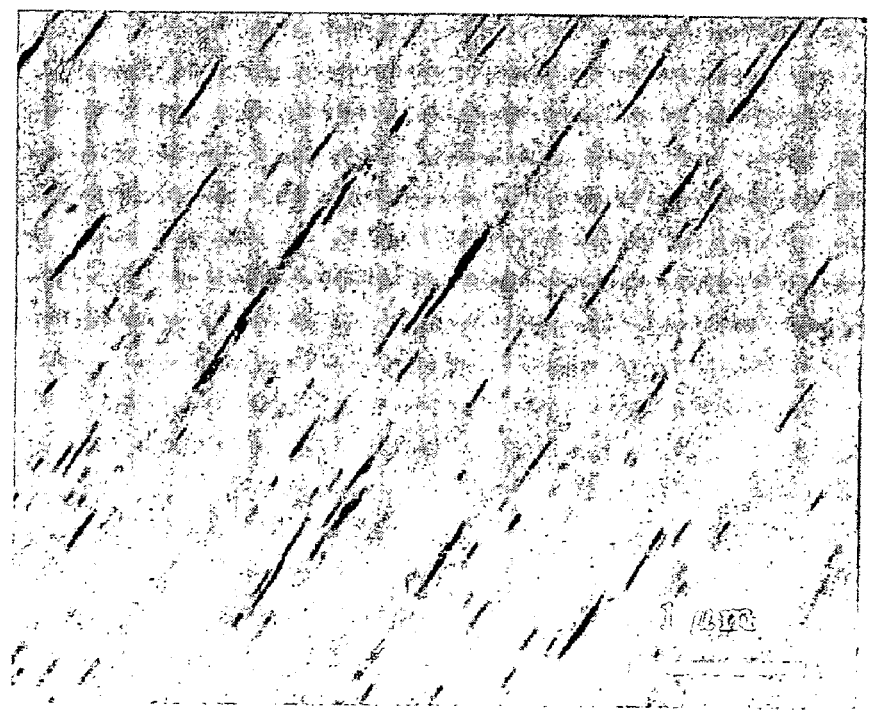
FIG. 4 is a photograph observed from a cross section of a polyester film produced in Example 4, wherein dark portions represent a cation-exchanged layered silicate.

The film obtained in Example 3 was stretched to 3.6 times in a longitudinal direction and to 3.6 times in a transverse direction (stretch ratio: 13 times) simultaneously at 150° C. at a stretch rate of 45/min. Then, the film was heat-set at 205° C. for 1 minute so as to give a biaxially oriented film. The properties of the obtained film are shown in Table 1. Further, a photograph of the film observed from a cross sectional direction is shown in FIG. 4.

Example 5

The film obtained in Example 3 was stretched to 3.0 times in a longitudinal direction and to 3.0 times in a transverse direction (stretch ratio: 9.0 times) simultaneously at 130° C. at a stretch rate of 38/min. Then, the film was heat-set at 205° C. for 1 minute so as to give a biaxially oriented film. The properties of the obtained film are shown in Table 1.

Reference Example 2

Synthesis of Layered Silicate Cation-Exchanged with N-decamethylimidazolium (Following Formula)

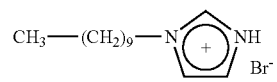

A layered silicate (abbreviated as C10I-M) cation-exchanged with N-decamethylimidazolium was obtained in the same manner as in Example 1 except that 10 parts by weight of N-decamethylimidazolium bromide (above formula) was used as an organic onium ion. The cation exchange rate of C10I-M was 130%, and the thermal decomposition temperature was 344° C.

Comparative Example 1

Figure 5:
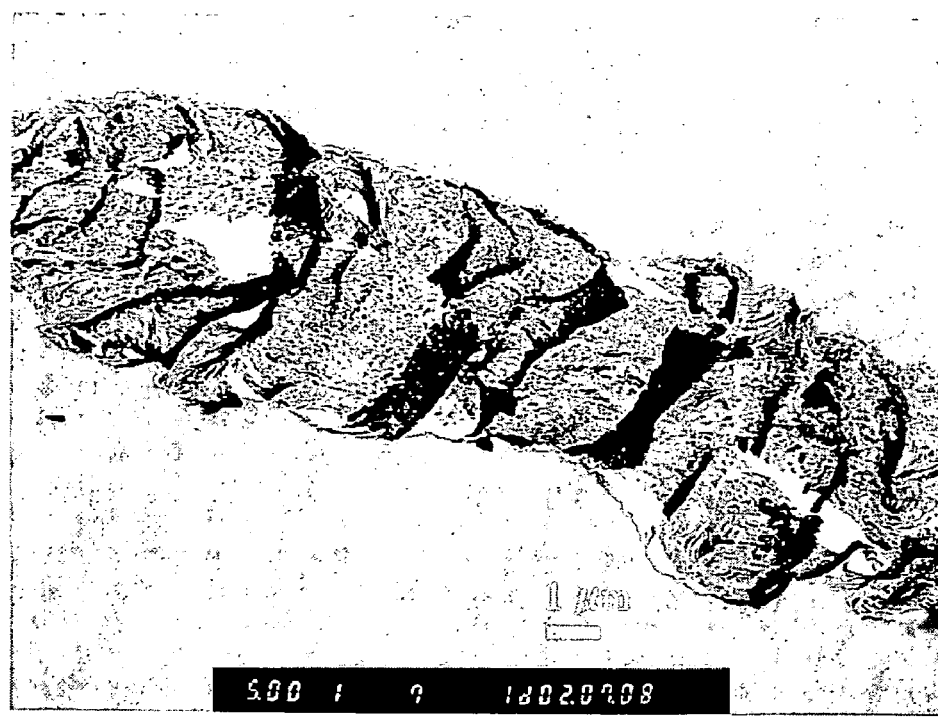
FIG. 5 is an electron micrograph of a resin composition of Comparative Example 1.

A composition comprising a poly(ethylene-2,6-naphthalenedicarboxylate) and a layered silicate was obtained in the same manner as in Example 1 except that 3.0 parts by weight of C10I-M synthesized in Reference Example 2 was used as the layered silicate. The weight ratio between the poly (ethylene-2,6-naphthalenedicarboxylate) and the layered silicate in terms of ash in the composition was 100:2. The melting point of the composition was 263° C., and its reduced viscosity was 0.72 dL/g. Further, when the state of the layered silicate dispersed in the composition was observed by use of a transmission electron microscope, a large agglomerate was observed as shown in FIG. 5, indicating low dispersibility.

Comparative Example 2

An unstretched film was obtained in the same manner as in Example 3 except that a poly(ethylene-2,6-naphthalate) (reduced viscosity: 0.78 g/dL) was used. The properties of the obtained film are shown in Table 2.

Comparative Example 3

The film obtained in Comparative Example 2 was processed in the same manner as in Example 4 so as to obtain a biaxially oriented film. The properties of the obtained film are shown in Table 2.

Comparative Example 4

The film obtained in Comparative Example 2 was processed in the same manner as in Example 5 so as to obtain a biaxially oriented film. The properties of the obtained film are shown in Table 2.

Example 6

5.0 parts by weight of montmorillonite and 500 parts by weight of water were charged into a flask and stirred under heating at 100° C. To the mixture, a solution obtained by dissolving 2.5 parts by weight of phthalimidedecamethyleneimidazolium bromide obtained in Reference Example 1 and 1.7 parts by weight of decylimidazolium bromide in 50 parts by weight of methanol was added, and the mixture was further stirred at 100° C. for 3 hours. Solids were separated from the mixture by filtration, washed with water and methanol alternately three times each and then dried so as to obtain a cation-exchanged layered silicate (abbreviated as IC10I/C10I-M). As a result of removing volatile components from the cleaning solution, phthalimidedecamethyleneimidazolium bromide and decylimidazolium bromide were recovered in a molar ratio of 4.5:5.5. From this result, the molar ratio between phthalimidedecamethyleneimidazolium and decylimidazolium contained in IC10I/C10I-M was estimated to be 5.5:4.5. The cation exchange rate of IC10I/C10I-M was 119%, the thermal decomposition temperature was 342° C., and the distance between layers was 25.8 Å.

Example 7

Figure 6:
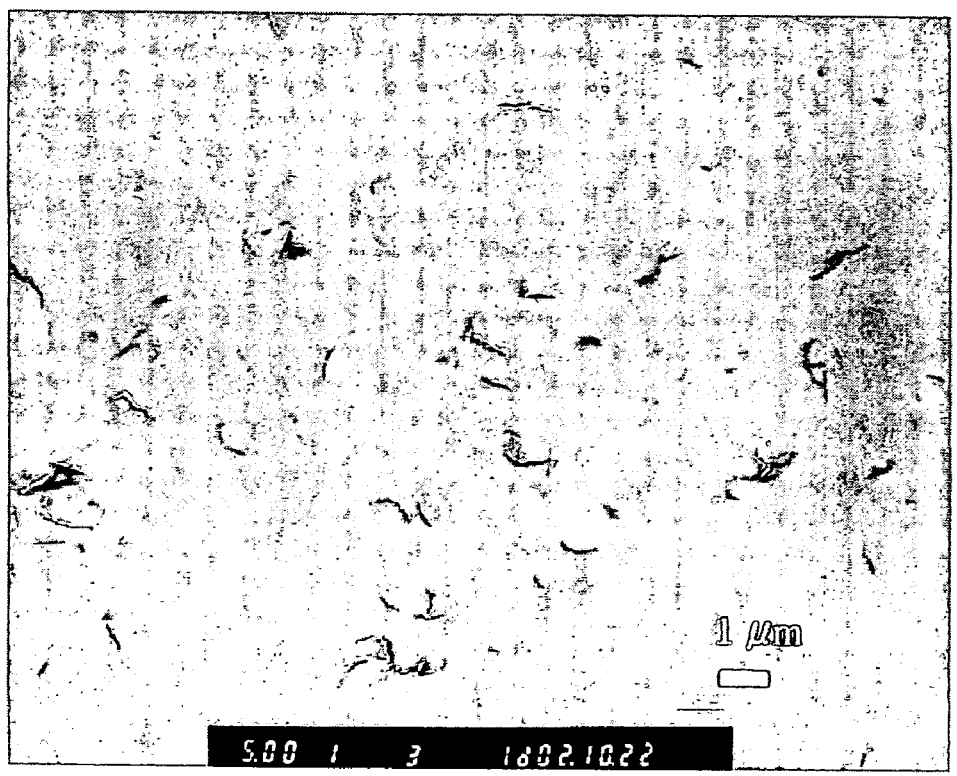
FIG. 6 is an electron micrograph of a resin composition of Example 7.

150 g of 2,6-bis(hydroxyethyl)naphthalene dicarboxylate, 3.2 g of the layered silicate IC10I/C10I-M obtained in Example 6 and 40 mg of antimony trioxide were charged into a flask and heated from 230° C. to 290° C. over 2 hours at a normal pressure under agitation. Then, the pressure was reduced from the normal pressure to 0.5 Torr over 1 hour at 290° C., and the mixture was polymerized at the pressure for 1 hour to give a composition comprising a poly(ethylene-2,6-naphthalenedicarboxylate) and the layered silicate. The weight ratio between the poly(ethylene-2,6-naphthalenedicarboxylate) and the layered silicate in terms of ash in the composition was 100:2. The melting point of the composition was 265° C., and its reduced viscosity was 0.81 dL/g. The resin composition was observed under a transmission electron microscope (FIG. 6). As shown in FIG. 6, the layered silicate was highly dispersed.

Reference Example 3

85 parts by weight of phthalimide potassium, 1,008 parts by weight of 1,10-dibromodecane and 430 parts by weight of (fully dehydrated) dimethyl formamide were charged into a flask, stirred, and heated at 100° C. for 20 hours. After heating, volatile components were all removed, and the residue was extracted with xylene. Volatile components were distilled off from the extracted solution, and the residue was left to stand at room temperature so as to obtain crystals of 10-bromodecamethylenephthalimide.

20 parts by weight of trioctylphosphine and 20 parts by weight of phthalimidedecamethyleneimidazolium bromide were charged into a flask, stirred and allowed to react under agitation at about 100° C. for 8 to 10 hours so as to obtain N-phthalimidedecamethylene-trioctylphosphonium bromide (following formula).

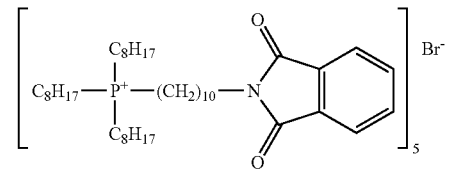

Example 8

100 parts by weight of KUNIPIA F, 3,000 parts by weight of water and 500 parts by weight of methanol were charged into a flask and stirred under heating at 80° C. To the mixture, a solution obtained by dissolving 120 parts by weight of N-phthalimidedecamethylene-trioctylphosphonium bromide obtained in Reference Example 3 in 300 parts by weight of methanol was added, and the resulting mixture was further stirred at 80° C. for 3 hours. Solids were separated from the mixture by filtration and washed with methanol three times and then with water three times so as to obtain a cation-exchanged layered silicate. The cation exchange rate was 65%, the thermal decomposition temperature was 374° C., and the distance between layers was 24.7 Å.

Example 9

A composition comprising a poly(ethylene-2,6-naphthalenedicarboxylate) and a layered silicate (weight ratio between the poly(ethylene-2,6-naphthalenedicarboxylate) and the layered silicate in terms of ash=100:7) was obtained in the same manner as in Example 2 by use of the layered silicate obtained in Example 8. The melting point of the composition was 265° C., and its reduced viscosity was 0.54 dL/g.

Example 10

860 parts by weight of the composition of Example 9 and 2,240 parts by weight of poly(ethylene-2,6-naphthalate)

(reduced viscosity: 0.78 g/dL) were melt-kneaded at a melt temperature of 300° C. by use of a twin-screw extruder. The obtained composition was extruded onto a cooling drum of 80° C. from a 1-mm-wide slit die at a melt temperature of 300° C. in the same manner as in Example 3 so as to obtain a film. The properties of the obtained film are shown in Table 1.

Example 11

The film obtained in Example 10 was stretched to 3.6 times in a longitudinal direction and to 3.6 times in a transverse direction (stretch ratio: 13 times) simultaneously at 150° C. at a stretch rate of 45/min. Then, the film was heat-set at 205° C. for 1 minute so as to give a biaxially oriented film. The properties of the obtained film are shown in Table 1.

TABLE 1

| Item | Unit | Ex. 3 | Ex. 4 | Ex. 5 | Ex. 10 | Ex. 11 |
|---|---|---|---|---|---|---|
| Film Thickness | μm | 148 | 10 | 15 | 150 | 12 |
| Layered silicate | | | | | | |
| Amount of Ash$^a$ | wt % | 2 | 2 | 2 | 2 | 2 |
| Distance between Layers | nm | 2.5 | 2.4 | 2.4 | 2.5 | 2.5 |
| Layer Thickness | nm | 7 | 7 | 7 | 9 | 9 |
| Diethylene Glycol Component | mol % | 1.8 | 1.8 | 1.8 | — | — |
| f of Polyester Portion | | 0.33 | 0.95 | 0.91 | 0.33 | 0.94 |
| f of Layered silicate | | 0.78 | 0.92 | 0.91 | 0.77 | 0.91 |
| (∠ACB)ave | ° | 126 | 161 | 154 | 130 | 158 |
| σ(∠A * B D * E) | | 14 | 2 | 3 | 16 | 3 |
| Tensile Modulus | Gpa | | | | | |
| MD | | 2.5 | 6.8 | 6.4 | 2.4 | 6.6 |
| TD | | 2.4 | 7.1 | 6.8 | 2.4 | 6.9 |
| Linear Expansion Coefficient | $10^{-6}$/° C. | | | | | |
| MD | | 81 | 6.2 | 7.8 | — | — |
| TD | | 79 | 5.9 | 7.4 | — | — |

Ex.: Example
a: Amount of a layered silicate in terms of ash based on 100 wt % of poly(ethylene-2,6-naphthalate)

TABLE 2

| Item | Unit | C. Ex. 2 | C. Ex. 3 | C. Ex. 4 |
|---|---|---|---|---|
| Film Thickness | μm | 155 | 11 | 15 |
| Layered silicate | | | | |
| Amount of Ash$^a$ | wt % | 0 | 0 | 0 |
| Average Layer Thickness | nm | — | — | — |
| Diethylene Glycol Component | mol % | 1.3 | 1.3 | 1.3 |
| f of Polyester Portion | | 0.33 | 0.91 | 0.91 |
| f of Layered silicate | | — | — | — |
| (∠ACB)ave | ° | — | — | — |
| σ(∠A * B D * E) | | — | — | — |
| Tensile Modulus | Gpa | | | |
| MD | | 2.3 | 6.1 | 5.1 |
| TD | | 2.3 | 6.2 | 5.2 |
| Linear Expansion Coefficient | $10^{-6}$/° C. | | | |
| MD | | 90 | 11 | 18 |
| TD | | 92 | 12 | 20 |

C. Ex.: Comparative Example
a: Amount of a layered silicate in terms of ash based on 100 wt % of poly(ethylene-2,6-naphthalate)

What is claimed is:

1. A film which comprises a thermoplastic composition comprising:
   (A) 100 parts by weight of at least one thermoplastic resin selected from the group consisting of a thermoplastic polyester and an aromatic polycarbonate, and
   (B) 0.1 to 10 parts by weight, in terms of ash content, of layered silicate having, as at least a portion of cations, an organic cation represented by the following formula (I):

$$(R)_n\text{-L}^+ \qquad (I)$$

wherein R is a group represented by the following formula (I-1):

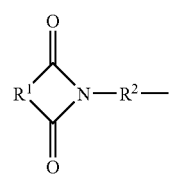

(I-1)

wherein $R^1$ is a divalent hydrocarbon group having 5 to 20 carbon atoms, and $R^2$ is a divalent hydrocarbon group having 1 to 20 carbon atoms, or R is an alkyl group, an aryl group or an aralkyl group, $L^+$ is an ammonium ion, a phosphonium ion or a hetero aromatic ion, and n is an integer of 1 to 5, with the proviso that when $L^+$ is an ammonium ion or a phosphonium ion, n is 4 and four Rs may be the same or different, and wherein at least one of the Rs is the group represented by the formula (I-1).

2. The film of claim 1 which is a monoaxially or biaxially oriented film.

3. The film of claim 2, wherein in X-ray diffraction when X-ray is irradiated in a perpendicular direction of a cross section of the film, an orientation factor f which corresponds to a diffraction peak with the highest intensity among diffractions from the layered silicate satisfies the following formula (II):

$$0.6 \leq f \leq 1 \qquad (II)$$

wherein $$f = \frac{3\langle\cos^2\phi\rangle - 1}{2}$$

-continued $$\langle\cos^2\phi\rangle = \frac{\int_0^{\frac{\pi}{2}} I(\phi)\cos^2\phi\sin\phi d\phi}{\int_0^{\frac{\pi}{2}} I(\phi)\sin\phi d\phi}$$

φ represents an azimuthal angle (degrees), and I(φ) represents diffraction intensity at the azimuthal angle φ.

4. The film of claim 2 or 3 wherein the shape of the cation-exchanged layered silicate observed from a cross section of the film satisfies the following formula (III):

$$120°\leq(\angle ACB)ave\leq180° \qquad (III)$$

wherein A, B and C are points in one layered silicate, A and B are both end points in a longitudinal direction of the layered silicate, C is the farthest point from a straight line connecting A to B, ∠ACB is an angle (°) formed by the line AC and the line BC, and (∠ACB)ave is the average of ∠ACB which is determined from 10 layered silicates with the first to tenth largest distances between the points A and B that are contained in a cross sectional area of 10 μm².

5. The film of claim 2 or 3, wherein the shape of the cation-exchanged layered silicate observed from a cross section of the film satisfies the following formula (IV):

$$0\leq\sigma(\angle A^*B\ D^*E)\leq16 \qquad (IV)$$

wherein A and B are points in one layered silicate and end points in a longitudinal direction of the layered silicate, A*B is a straight line connecting the point A to the point B, D*E is a reference straight line prepared on the cross section of the film, ∠A*B D*E is an acute angle (°) formed by A*B and D*E, and σ(∠A*B D*E) is the standard deviation of ∠A*B D*E which is determined for 10 layered silicates with the first to tenth largest distance between the points A and B that are contained in an arbitrary cross sectional area of 10 μm².

6. The film of claim 1, wherein the thermoplastic polyester is an aromatic polyester.

7. The film of claim 6, wherein the aromatic polyester is a poly(ethylene terephthalate), a poly(1,3-trimethylene terephthalate), a poly(1,4-butylene terephthalate) and a poly(ethylene-2,6-naphthalene dicarboxylate).

8. The film of claim 1, wherein the aromatic polycarbonate is a polycarbonate based on bisphenol A.

9. The film of claim 1, wherein the thickness of the layered silicate in a cross section of the film is 3 to 100 nm.

10. A thermoplastic resin composition comprising: (A') 100 parts by weight of thermoplastic resin, and (B) 0.1 to 10 parts by weight in terms of ash content of layered silicate having, as at least a portion of cations, the organic cation represented by the formula (I):

$$(R)_n\text{-}L^+ \qquad (I)$$

wherein at least one of Rs is the group represented by the formula (I-1):

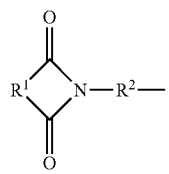

(I-1)

wherein R¹ is a divalent hydrocarbon group having 5 to 20 carbon atoms, and R² is a divalent hydrocarbon group having 1 to 20 carbon atoms, or R is an alkyl group, an aryl group or an aralkyvl group, L⁺ is an ammonium ion, a phosphonium ion or a hetero aromatic ion, and n is an integer of 1 to 5, with the proviso that when L⁺ is an ammonium ion or a phosphonium ion, n is 4 and four Rs may be the same or different.

11. The composition of claim 10, wherein the layered silicate has the organic cation such that a cation exchange percentage (%) represented by the following formula (VI) is 50 to 200

$$\text{Cation Exchange Percentage (\%)}=\{Wf/(1-Wf)\}/(M_{org}/M_{si})\times100 \qquad (VI)$$

Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge, where the molecular weight per charge in the layered silicate is a value calculated by a reciprocal of the cation exchange capacity, unit: gram equivalent or eq/100 g, of the layered silicate.

12. The composition of claim 10, wherein the layered silicate has a thermal decomposition temperature of not lower than 310° C.

13. The composition of claim wherein the layered silicate is smectite, vermiculite or mica in which at least a portion of cations has been replaced by the organic cation.

14. A layered silicate having, as at least a portion of cations, an organic cation represented by the following formula:

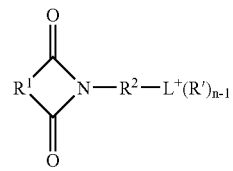

wherein R¹ is a divalent hydrocarbon group having 5 to 20 carbon atoms, R² is a divalent hydrocarbon group having 1 to 20 carbon atoms, R' is a group represented by the formula (I-1):

(I-1)

wherein R¹ and R² are the same as defined above, an alkyl group, an aryl group or an aralkyl group, L⁺ is an ammonium ion, a phosphonium ion or a hetero aromatic ion, and n is 1 to 5.

15. The silicate of claim 14, which has the organic cation such that a cation exchange percentage (%) represented by the following formula (VI) is 50 to 200

$$\text{Cation Exchange Percentage (\%)}=\{Wf/(1-Wf)\}/(M_{org}/M_{si})\times100 \qquad (VI)$$

Wf represents a weight reduction ratio of the layered silicate measured by a thermogravimetric analysis from 120° C. to 800° C. at a temperature increasing rate of 20° C./min, $M_{org}$ represents the molecular weight of the imidazolium ion, and $M_{si}$ represents a molecular weight of the layered silicate per charge, where the molecular weight per charge in the layered silicate is a value calculated by a reciprocal of the cation exchange capacity, unit: gram equivalent or eq/100 g, of the layered silicate.

16. The silicate of claim 14, which has a thermal decomposition temperature of not lower than 310° C.

17. The silicate of claim 14, which is smectite, vermiculite or mica in which at least a portion of cations has been replaced by the organic cation.

* * * * *